United States Patent
Riccardi et al.

(10) Patent No.: US 7,571,160 B2
(45) Date of Patent: *Aug. 4, 2009

(54) SYSTEMS AND METHODS FOR IMPLEMENTING AN XML QUERY LANGUAGE

(75) Inventors: Fabio Riccardi, Palo Alto, CA (US); Paul J. Lucas, Mountain View, CA (US); Daniela D. Florescu, Palo Alto, CA (US); Donald Alan Kossmann, Zurich (CH); Till Carsten Westmann, Munich (DE); Christopher James Hillery, Vacaville, CA (US)

(73) Assignee: Bea Systems, Inc., Redwood Shores, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 10/999,746

(22) Filed: Nov. 30, 2004

(65) Prior Publication Data

US 2005/0114328 A1 May 26, 2005

Related U.S. Application Data

(63) Continuation of application No. 10/787,714, filed on Feb. 26, 2004, now Pat. No. 7,194,462.

(60) Provisional application No. 60/450,381, filed on Feb. 27, 2003.

(51) Int. Cl.
*G06F 7/00* (2006.01)

(52) U.S. Cl. .................. 707/4; 707/2; 707/3; 707/100; 707/102; 707/104.1

(58) Field of Classification Search ..................... 707/3, 707/100, 4
See application file for complete search history.

(56) References Cited

U.S. PATENT DOCUMENTS

| 6,366,934 | B1 | 4/2002 | Cheng et al. ................. 707/513 |
| 6,654,734 | B1 | 11/2003 | Mani et al. ..................... 707/2 |
| 2004/0073870 | A1* | 4/2004 | Fuh et al. ..................... 715/513 |

OTHER PUBLICATIONS

Kiesling, Tobias, Towards a Stream XPath Evaluation, Institut Fur Informatik, Jul. 8, 2002, pp. 1-75.*

* cited by examiner

*Primary Examiner*—Cheyne D Ly
(74) *Attorney, Agent, or Firm*—Fliesler Meyer LLP

(57) ABSTRACT

Systems and methods in accordance with the present invention provide for an implementation of the XQuery standard, and such an implementation will be referred to herein as an XQuery (XML Query language) implementation. An XQuery implementation can be based on a token stream representation, which allows large XML documents to be processed without having to first read the entire document. An XQuery implementation can also utilize a streaming XQuery engine. A set of algorithms and a set of rewrite rules can be used for the implementation. Given a query, a set of rules can be applied to that query to transform the query into another query. Some of these rules allow the resulting query to be streamable. In other words, a query that would otherwise require an XML document to be read into memory can now be transformed into a query that can work on an XML stream. The type system of the XQuery language can be based on XML Schema, and the basic types of XML Schema can have derived types. The XQuery programs can execute in a context comprising of variable bindings, namespaces, operators, default parameters, etc. This description is not intended to be a complete description of, or limit the scope of, the invention. Other features, aspects, and objects of the invention can be obtained from a review of the specification, the figures, and the claims.

18 Claims, 1 Drawing Sheet

SYSTEMS AND METHODS FOR IMPLEMENTING AN XML QUERY LANGUAGE

CLAIM OF PRIORITY

This application is a continuation application of U.S. patent application Ser. No. 10/787,714, entitled SYSTEMS AND METHODS FOR IMPLEMENTING AN XML QUERY LANGUAGE, by Fabio Riccardi, filed Feb. 26, 2004, which claims the benefit of U.S. Provisional Patent Application No. 60/450,381, filed Feb. 27, 2003, entitled "SYSTEMS AND METHODS FOR IMPLEMENTING AN XML QUERY LANGUAGE", by Fabio Riccardi, both of which are incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the querying of XML data.

BACKGROUND

XQuery is a standard query language for XML documents, published by the W3C (World Wide Web Consortium) to define query requests and handle query results. XQuery is designed to be an efficient language in which queries are concise and easily understood.

The XQuery language is derived from various sources, including SQL. It even provides a For-Let-Where-Return (FLWR—pronounced "flower") expression. Developers familiar with SQL will find XQuery very easy to learn.

DETAILED DESCRIPTION

Figure 1:
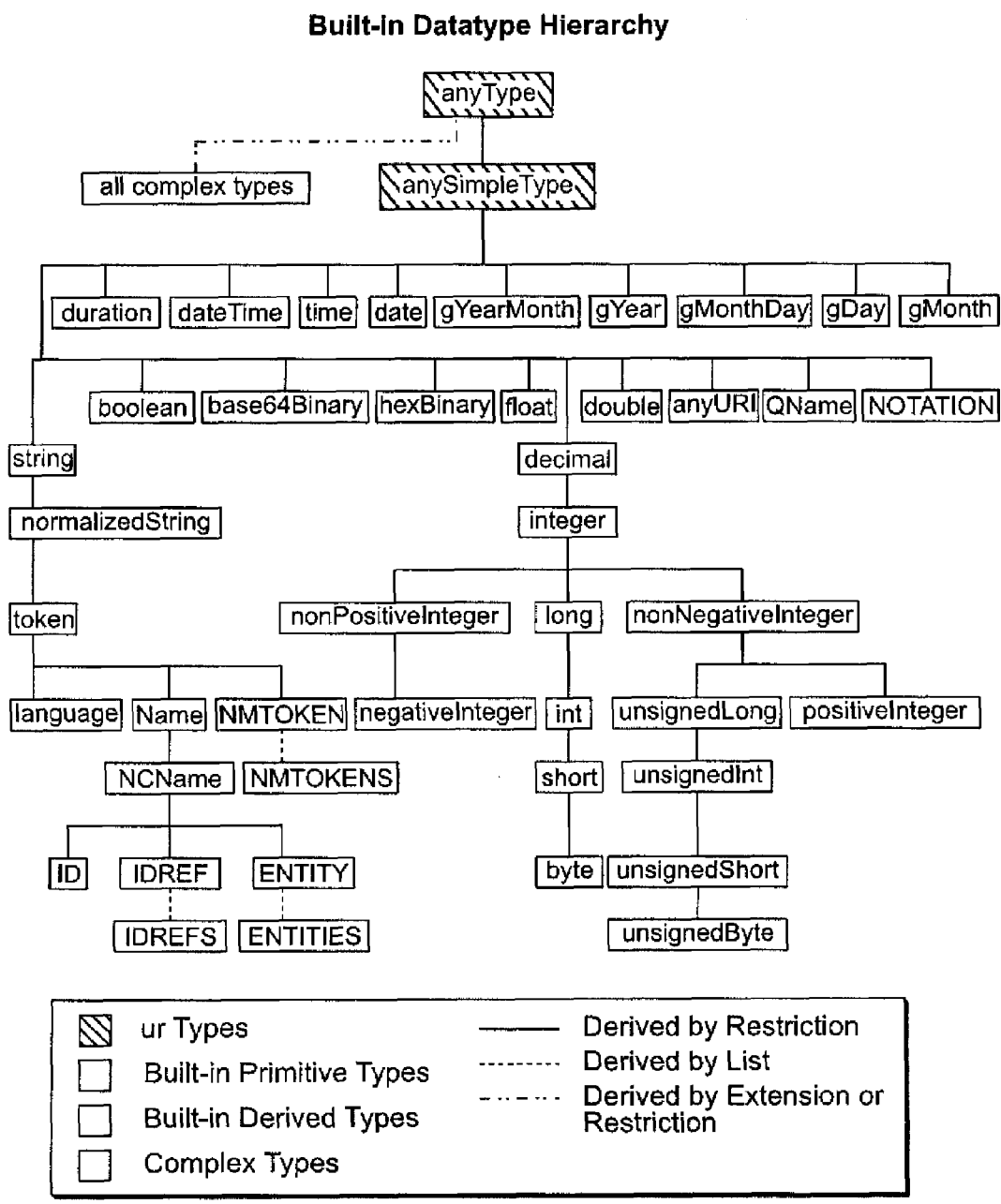
FIG. 1 is a diagram of exemplary data type hierarchy showing complex data types directly by their structure, eventually reducing to a structured composition of simple types and their derivatives.

Systems and methods in accordance with the present invention provide for an implementation of the XQuery standard, and such an implementation will be referred to herein as an XQuery (XML Query language) implementation. An XQuery implementation can be based on a token stream representation, which allows large XML documents to be processed without having to first read the entire document. A set of algorithms and a set of rewrite rules can be used for the implementation. Given a query, a set of rules can be applied to that query to transform the query into another query. Some of these rules can allow the resulting query to be streamable. In other words, a standard query that would otherwise require an XML document to be read into memory, can now be transformed into a query that can work on an XML stream.

In many cases, such a transformation can be applied to a query such that the entire query process is streamable. For example, a user could generate a query where data is to be sorted in a particular order. Later, that query might be used in a larger context where the order is not important. An XQuery implementation can analyze the query and can determine that it would be an unnecessary use of resources to sort the result later. Sorting typically requires all the data to be read into memory and stored until all elements are known. If the sorting step is eliminated from the later query, it is possible to process the XML on an XML stream.

A user or developer can add extensions or annotations to the XQuery language in order to address certain aspects that are not yet covered in the draft standard. A graphical user interface can be used with an XQRL implementation that allows a user to build data transformations.

Token Stream

A token stream (TS) is an XML representation that can be used throughout an XQuery language implementation. A token stream can be compact and efficient. The tokenized format can represent the structure of an XML document with a minimal memory footprint even in the presence of repetitive elements. Although a token stream can be designed for the internal data representation of a processor, the stream can also be used for application interchange. A token stream can be used to easily manage XML fragments and is easily serializable on both network and disk. If an application uses XQuery as a principal means for XML processing, intermediate results may be directly available for data processing.

An XQuery processor, such as Xquery, can process XML data in a streaming fashion. A data transformation operation, or query, in XQuery can be decomposed into a series of successive elementary operations on the data itself. Accordingly, an XQuery expression can be transformed by the XQuery processor into a sequence of elementary operators, with each operation applying a transformation on its input and feeding its output to the next operator.

Accordingly, instead of completely consuming input before performing the transformation, each operator can consume a minimal amount of input and can immediately begin to produce results that can be directly available to the next operator.

Using such an approach, an operator may not need to buffer large amounts of data thereby reducing memory consumption. Also, the result of such a query can be made available as soon as possible, often well before the input data has been completely consumed.

A streaming implementation can be consumer directed such as using a 'pull' mode. A consumer of the result of the query can demand data tokens from the last operator composing the query. The last operator can, in turn, ask for data from the previous operators, and so on, up to the input source.

As indicated above, to make such a flow of data possible, the data can be represented in a format that is granular enough for this processing, such as the token stream. As the name implies, a token stream is a tokenized representation of an XML data fragment. Repeating structural elements can be replaced by tokens, which can retain the semantics of the original data element, discarding unnecessary information accompanying those elements.

The XQuery processor can be implemented in the Java programming language, which can have tokens represented by objects. Repeating elements in the stream can be repetitions of the same pointer to a single object.

Tokens in a token stream can be immutable objects. Data transformations can be performed on the same input tokens coming from an XML parser or tokenizer. The output of the query can be made of the same exact tokens as the input, and possibly some generated by element constructors. Such an approach can keep the rate of object creation to a minimum during the different phases of data transformation.

For example, consider the following XML data fragment:

```
Schema:
    <xsd:complexType name="vote">
        <xsd:simpleContent>
            <xsd:extension base="xsd:float">
                <xsd:attribute name="index" type="xsd:int"/>
            </xsd:extension>
        </xsd:simpleContent>
    </xsd:complexType>
    <xsd:element name="judgement" type="vote"/>
Data Instance:
    <judgement index="11">43.5</judgement>
```

The tokenizer and the schema validator can transform the previous data fragment in the following sequence of tokens:

```
[Begin Element]
QName : [judgement@http://www.xqrl.com/example1]
QName : [vote@http://www.xqrl.com/example1]
[Begin Attribute]
QName : [index]
QName : [int@http://www.w3.org/2001/XMLSchema]
int : 11
[End Attribute]
[Begin Text]
CharData : "43.5"
[End Text]
float : 43.5
[End Element]
```

In the example, the first token [Begin Element] marks the beginning of the element judgement. Following is a QName token indicating the fully qualified name for the element, and another QName specifying the type of the element as it is defined in the schema. [Begin Attribute] marks the beginning of the attribute, following the QName with its name and type. A typed value token (represented by int: 11) gives the value of the attribute as an integer. [End Attribute] marks the end of the attribute.

According to the XQuery specification, the original lexical representation for each element should be available for processing, thereby the [Begin Text] CharData : "43.5" [End Text] tokens, followed by the value token carrying the typed float representation of the element's data float: 43.5 and finally the [End Element] token marks the end of the element judgment.

The type system of the XQuery language can be based on XML Schema. XML Schema has a number of built-in basic types (elements in the FIG. 1 below: duration, dateTime, time, date, gYearMonth, gYear, gMonthDay, gDay, gMonth, Boolean, base64Binary, hexBinary, float, double, anyURI, QName, NOTATION, string, decimal) that exist as typed tokens in the Token Stream representation. Each basic type can have derived types that are represented by typed tokens inheriting from the base type and having an additional field specifying the name of the derived type. The physical data representation and the default behavior is instead shared with the parent, the derivation being essentially a restriction of the parent type.

As seen in the previous example, complex data types can be represented directly by their structure, eventually reducing to a structured composition of simple types and their derivatives. An exemplary data type hierarchy is given by FIG. 1.

A second example shows an entire XML document and its tokenized representation. In the token stream the [Begin Document] and [End Document] tokens can be seen, as well as the name space declarations and a few additional data types.

The Schema:

```
<?xml version="1.0" encoding="UTF-8"?>
<xsd:schema xmlns:xsd='http://www.w3.org/2001/XMLSchema'
        xmlns="http://www.xqrl.com/example1"
        targetNamespace="http://www.xqrl.com/example1"
        elementFormDefault="qualified" >
    <xsd:complexType name="rootType">
        <xsd:sequence>
            <xsd:element name="judgement" type="vote"
                            minOccurs="1" maxOccurs="5"/>
        </xsd:sequence>
    </xsd:complexType>
    <xsd:complexType name="vote">
        <xsd:simpleContent>
            <xsd:extension base="grade">
                <xsd:attribute name="index"
                                    type="xsd:int" default="0"/>
            </xsd:extension>
        </xsd:simpleContent>
    </xsd:complexType>
    <xsd:simpleType name="grade">
        <xsd:union>
            <xsd:simpleType>
                <xsd:restriction base="xsd:date"/>
            </xsd:simpleType>
            <xsd:simpleType>
                <xsd:restriction base="xsd:int"/>
            </xsd:simpleType>
            <xsd:simpleType>
                <xsd:restriction base="xsd:float"/>
            </xsd:simpleType>
            <xsd:simpleType>
                <xsd:restriction base="xsd:double"/>
            </xsd:simpleType>
            <xsd:simpleType>
                <xsd:restriction base="xsd:string"/>
            </xsd:simpleType>
        </xsd:union>
    </xsd:simpleType>
    <xsd:element name="root" type="rootType"/>
</xsd:schema>
```

A Data Instance:

```
<?xml version="1.0" encoding="UTF-8"?>
<root xmlns="http://www.xqrl.com/example1"
        xmlns:xsi="http://www.w3.org/2001/XMLSchema-instance"
        xsi:schemaLocation="http://www.xqrl.com/example1 tests/schema/
        example1.xsd" >
    <judgement index="11">43.5</judgement>
    <judgement>3.14</judgement>
    <judgement>pizza</judgement>
    <judgement>2002-06-14</judgement>
</root>
```

The Token Stream:

```
[Begin Document]
[Begin Element]
QName : [root@http://www.xqrl.com/example1]
QName : [rootType@http://www.xqrl.com/example1]
[Begin Namespace]
QName : [@http://www.xqrl.com/example1]
```

-continued

```
[End Namespace]
[Begin Namespace]
QName : [xsi@http://www.w3.org/2001/XMLSchema-instance]
[End Namespace]
[Begin Attribute]
QName : [schemaLocation@http://www.w3.org/2001/XMLSchema-instance]
QName : [anySimpleType@http://www.w3.org/2001/XMLSchema]
CharData : "http://www.xqrl.com/example1 tests/schema/example1.xsd"
[End Attribute]
[Begin Text]
CharData : "\n\n "
[End Text]
[Begin Element]
QName : [judgement@http://www.xqrl.com/example1]
QName : [vote@http://www.xqrl.com/example1]
[Begin Attribute]
QName : [index]
QName : [int@http://www.w3.org/2001/XMLSchema]
int : 11
[End Attribute]
[Begin Text]
CharData : "43.5"
[End Text]
float : 43.5
[End Element]
[Begin Text]
CharData : "\n "
[End Text]
[Begin Element]
QName : [judgement@http://www.xqrl.com/example1]
QName : [vote@http://www.xqrl.com/example1]
[Begin Attribute]
QName : [index]
QName : [int@http://www.w3.org/2001/XMLSchema]
int : 0
[End Attribute]
[Begin Text]
CharData : "3.14"
[End Text]
float : 3.14
[End Element]
[Begin Text]
CharData : "\n "
[End Text]
[Begin Element]
QName : [judgement@http://www.xqrl.com/example1]
QName : [vote@http://www.xqrl.com/example1]
[Begin Attribute]
QName : [index]
QName : [int@http://www.w3.org/2001/XMLSchema]
int : 0
[End Attribute]
[Begin Text]
CharData : "pizza"
[End Text]
string : pizza
[End Element]
[Begin Text]
CharData : "\n "
[End Text]
[Begin Element]
QName : [judgement@http://www.xqrl.com/example1]
QName : [vote@http://www.xqrl.com/example1]
[Begin Attribute]
QName : [index]
QName : [int@http://www.w3.org/2001/XMLSchema]
int : 0
[End Attribute]
[Begin Text]
CharData : "2002-06-14"
[End Text]
date : 2002-6-14T0:0:0.0□
[End Element]
[Begin Text]
CharData : "\n"
[End Text]
```

-continued

```
[End Element]
[End Document]
```

Context

XQuery programs can execute in a Context. The Context can hold the variable bindings, namespaces, operators, and default parameters.

Furthermore, the Context can hold (static) references to an IDManager. The IDManager is in charge of creating node IDs in XML documents. A type manager used by the static type inference engine and run-time type validation, and a schema manager or database of XML schemas.

The Context can be entirely defined at query compilation or preparation time and may never be modified by query execution. The compiler also resolves all the elements of the Context to direct pointer references in the compiled query. Consequently, a query execution engine may never need to resolve variables by their name at run time.

To implement the semantics of FLWR expressions, implicit variables defined in XPath expressions and order by clauses, a new Context can be created holding the newly (implicitly or explicitly) scoped variables. This new context can be linked to its parent. All variables of the parent can be accessible from the context, possibly except for those that are redefined by the new context shadowing their parent counterpart.

To factor things and to reduce start-up time, a base context can be used to hold the default environment that can include standard namespaces, built-in functions and operators, and default behaviors.

Queries can reuse pre-initialized contexts, but they may not be able to directly modify those contexts. A new scratch context can always be created for query execution, which can inherit directly from the base context or from another explicitly-given context. Special queries can be used to pre-initialize contexts to be reutilized by subsequent queries, reducing the cost of context creation.

Given their critical nature, execution contexts may not be directly accessible to the user. Execution objects can be opaque objects embedded in Connection objects that are provided in one embodiment by an XDBC interface.

A Connection object can be created through an interface such as a DriverManager getConnection interface, and can be used to prepare statements that are subsequently populated using a special query prologue, such as a populateContext method of Connection.

Contexts can be saved for later use associating them to a URI such as by using a publish method of a DriverManager such that other contexts can be subsequently created inheriting from the saved ones.

EXAMPLES

```
// derive a connection from the Base Context (default)
Connection c = DriverManager.getConnection( );
// populate it with someXQuery prologue
c.populateContext(prologue);
// publish it!
DriverManager.publish("www.xqrl.com/contexts/stuffed", c);
// some other time, some other place, ...
// derive a Connection from the previously saved one
Connection c = DriverManager.getConnection(
                    "www.xqrl.com/contexts/stuffed",
```

```
                Connection.Type.INHERITED);
// use it to execute your favorite query!
PreparedStatement ds =
        (PreparedStatement) c.prepareStatement(dataQuery);
TokenIterator doc = ds.executeQuery( );
```

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for an implementation of XML Query language, comprising the steps of:
    receiving an XQuery request;
    creating a token stream representation of one or more XML documents that are required to process said XQuery request, wherein the step of creating the token stream further comprises
        accessing an XML document,
        parsing a schema associated with the XML document,
        using the contents of the schema associated with the XML document to create a tokenized representation of the entire XML document, as a sequence of tokens describing the XML document, and including within the sequence of tokens a namespace declaration for the XML document, name tokens indicating a fully qualified name for each element, and name tokens specifying a type of the element as defined in the schema, and
        populating the tokens with one of data from the XML schema or data from the XML document;
    transforming said XQuery request into a second query that can work on said token stream representation; and
    executing said second query on said token stream representation,
    wherein said transforming step further comprises converting said XQuery request into a sequence of elementary operators, and applying the sequence of elementary operators against the tokenized representation of the XML document, with each operator applying a transformation of the operator input and feeding the operator output to the next operator, and
    wherein instead of completely consuming input before performing the transformation, each operator consumes a minimal amount of input and immediately begins to produce results, that is directly available to the next operator.

2. The method according to claim 1, wherein:
said implementation further allows a user to add extensions and annotations to said XQuery language.

3. The method according to claim 1, wherein:
said token stream representation is serializable.

4. The method according to claim 1, wherein:
said token stream representation comprises tokens that are immutable objects.

5. The method according to claim 1, wherein:
said transforming step further comprises keeping the rate of object creation to a minimum during all phases of data transformation by using the exact tokens of said token stream representation for the output of said XQuery request.

6. The method according to claim 1, wherein:
said token stream representation comprises typed tokens, wherein each typed token specifies the type of XML element of the XML document represented.

7. The method according to claim 6, wherein:
said typed tokens have derived types, wherein said derived types share physical data representation and default behavior with said typed tokens.

8. The method according to claim 1, further comprising:
executing said XQuery request in a context, wherein said context is comprised of resources required for said XQuery request execution.

9. A system for an implementation of XML Query language, comprising:
    an interface for receiving an XQuery request; and
    an XQuery request processor for
        accessing an XML document required to process the XQuery request,
        creating a token stream representation of the entire XML document, wherein the step of creating the token stream further comprises
            parsing a schema associated with the XML document,
            using the contents of the schema associated with the XML document to create a tokenized representation of the entire XML document, as a sequence of tokens describing the XML document, and including within the sequence of tokens a namespace declaration for the XML document, name tokens indicating a fully qualified name for each element, and name tokens specifying a type of the element as defined in the schema, and
            populating the tokens with one of data from the XML schema or data from the XML document,
        transforming the XQuery request into a streamable XML query, including converting the XQuery request into a sequence of elementary operators, and causing each operator to apply a transformation of the operator input and feed the operator output to the next operator in the sequence, and wherein each operator receives a portion of the operator input and immediately begins to produce a query result, before completing the processing of the entire XQuery request, and
        executing the streamable XQuery, including applying the sequence of elementary operators against the tokenized representation of the XML document.

10. The system of claim 9, wherein the token stream representation is serializable.

11. The system of claim 9, wherein the XQuery request processor further minimizes the rate of object creation during data transformation by using exact tokens of the token stream representation for output of the XQuery request.

12. The system of claim 9, wherein the token stream representation comprises typed tokens, and wherein each of the typed tokens specifies a type of XML element of the XML document represented.

13. The system of claim 9, wherein the XQuery request processor further executes the XQuery request in a context, wherein the context comprises resources required for the XQuery request execution.

14. A method for an implementation of XML Query language, comprising the steps of:

receiving an XQuery request;

determining one or more XML documents that will be used to provide data in response to the XQuery request;

retrieving an XML schema for each of the one or more XML documents that will be used to provide data;

generating a token stream representation of the one or more XML documents by accessing each XML document, parsing the schema associated with that XML document, using the contents of the schema associated with that XML document, to create a tokenized representation of the entire XML document, as a sequence of tokens describing the XML document, and including within the sequence of tokens a namespace declaration for the XML document, name tokens indicating a fully qualified name for each element, and name tokens specifying a type of the element as defined in the schema, populating the plurality of tokens with data from the XML document and in accordance with the XML schema, continuing with each XML document to create a token stream representation of the one or more XML documents;

transforming the XQuery request into a second query that includes a sequence of elementary operators and that can be applied to the generated token stream representation; and executing the second query on the token stream representation by applying the sequence of elementary operators against the tokenized representation of the one or more XML documents, and requiring each of the sequence of elementary operators to consume a portion of the token stream representation and immediately begin to produce a partial result, that can then be made available to the next elementary operator in the sequence.

15. The method according to claim 14 wherein the step of creating a plurality of tokens according to the schema for that XML document further comprises including within each token a namespace declaration for the XML document.

16. The method according to claim 14 wherein the token stream representation is serializable.

17. The method according to claim 14 wherein the token stream representation comprises tokens that are immutable objects.

18. The method according to claim 14 wherein the step of creating a plurality of tokens according to the schema for that XML document further comprises determining any repeated structural elements in the XML document, and replacing those repeated structural elements in the XML document with tokens which retain the semantics of the original data element, and discarding any unnecessary information accompanying those elements.

* * * * *

UNITED STATES PATENT AND TRADEMARK OFFICE
CERTIFICATE OF CORRECTION

PATENT NO. : 7,571,160 B2  Page 1 of 1
APPLICATION NO. : 10/999746
DATED : August 4, 2009
INVENTOR(S) : Fabio Riccardi et al.

It is certified that error appears in the above-identified patent and that said Letters Patent is hereby corrected as shown below:

In column 7, line 63, in claim 3, delete "1,wherein:" and insert -- 1, wherein: --, therefor.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,571,160 B2  Page 1 of 1
APPLICATION NO. : 10/999746
DATED : August 4, 2009
INVENTOR(S) : Riccardi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 429 days.

Signed and Sealed this

Seventh Day of September, 2010

David J. Kappos
*Director of the United States Patent and Trademark Office*